(12) United States Patent
Specker

(10) Patent No.: US 7,032,609 B2
(45) Date of Patent: Apr. 25, 2006

(54) VACUUM FEED SYSTEM FOR LIQUID CHEMICAL FEEDING

(75) Inventor: Howard P. Specker, Port St. Lucie, FL (US)

(73) Assignee: Chemical Injection Technologies, Inc., Fort Pierce, FL (US)

( * ) Notice: Subject to any disclaimer, the term of this patent is extended or adjusted under 35 U.S.C. 154(b) by 23 days.

(21) Appl. No.: 10/924,896

(22) Filed: Aug. 25, 2004

(65) Prior Publication Data

US 2006/0042687 A1  Mar. 2, 2006

(51) Int. Cl.
*G05D 7/01* (2006.01)
*G05D 11/03* (2006.01)
(52) U.S. Cl. ............... 137/114; 137/613; 137/614.2; 137/893
(58) Field of Classification Search ............. 137/114, 137/613, 614.2, 893, 895, 907
See application file for complete search history.

(56) References Cited

U.S. PATENT DOCUMENTS

| | | | | |
|---|---|---|---|---|
| 3,194,254 A | * | 7/1965 | Zmek | 137/114 |
| 3,817,264 A | * | 6/1974 | Kilayko | 137/111 |
| 5,285,808 A | * | 2/1994 | Clanin | 137/114 |
| 2002/0170853 A1 | * | 11/2002 | Alexander | 210/169 |

* cited by examiner

*Primary Examiner*—Ramesh Krishnamurthy
(74) *Attorney, Agent, or Firm*—Ronald E. Greigg

(57) ABSTRACT

A vacuum feed system for feeding liquid chemical into a stream of a second liquid flowing in a conduit includes a venturi connected in the conduit for supplying vacuum through first and second one-way check valves, a flow regulating valve, and a vacuum regulated flow control valve connected to a supply of liquid chemical to be fed. A pressure relief valve connected between the first and second check valves prevents back flow through the system. The components of the system, from the vacuum regulated flow control valve to the venturi, are arranged to provide a continuous upward flow path to thereby eliminate trapped gas in the system.

7 Claims, 2 Drawing Sheets

VACUUM FEED SYSTEM FOR LIQUID CHEMICAL FEEDING

BACKGROUND OF THE INVENTION

1. Field of the Invention

This invention relates to liquid chemical feeding systems and more particularly to a improved vacuum feeding system for feeding liquid chemicals at a controlled uniform rate into a pressurized stream of another liquid flowing in a conduit, or into another liquid in a storage container at atmospheric pressure.

2. Description of the Prior Art

Vacuum feed systems employing a venturi to produce the vacuum for introducing liquid chemicals into other liquids are well known. Such systems are commonly employed in water and sewage treatment facilities for injecting liquid treatment chemicals into pressurized pipes, storage tanks or pools. For example, systems are known for feeding sodium hypochlorite solution (hereinafter sometimes called liquid chlorine) into water treatment systems using a venturi to induce the liquid chlorine flow and employing a flow meter with a flow rate adjusting valve. The use of vacuum regulators and differential pressure regulators in such systems is known.

Despite the attempts to control flow, all the known systems have had difficulty in maintaining a continuous set feed rate, which may be critical, for example when dispensing liquid chlorine into drinking water at the precise rates required by regulating agencies. Also, such known systems frequently cannot repeat a set feed rate in start and stop operation.

Another problem encountered in the known systems when used to feed liquid chlorine is the propensity of this chemical to "off gas" air and chlorine gas which can form bubbles in the system and interfere with its smooth operation.

U.S. Patent 2002/017083 to Alexander discloses one known vacuum system for the addition of a chemical into water either in a swimming pool or into potable water. The chemical used in this invention is liquid chlorine such as sodium hypochlorite. A venturi is connected into the water feed line, and an additive stream inlet is connected to the venturi. A metering valve is used to set the flow rate of the chemical being added, and a flow meter provides a visual indication of the flow rate of the chlorine additive. The chlorine being added is fed via input line into a U-shaped feed line which includes a solenoid operated valve (25) connected to a microprocessor (26) which senses when additional chlorine needs to be added to the water. A shut off valve and a clean out valve permits cleaning the U-shaped feed line. All the components of the feed line are constructed of corrosive resistant material as are the piping and joints which connect the components together.

The liquid feed system disclosed in the Alexander patent does not contain means for positively preventing back-flow of liquid through the system, and its construction is such as to make it particularly susceptible to trapping gas bubbles.

U.S. Pat. Nos. 5,827,959; 5,285,808; 3,194,254; and 3,187,764 disclose systems for feeding gaseous chemicals into a liquid, using a venturi to apply a suction to the gaseous chemical feed line. The feeding of a liquid into another liquid at a controlled rate presents problems well-known to those skilled in the art, which problems are not found in feeding a gas into a liquid.

OBJECTS AND ADVANTAGES OF THE INVENTION

It is an object of the present invention to provide an improved vacuum feed system for liquid chemical feeding which overcomes the above-mentioned disadvantages of the known systems and which enables the reliable continuous feeding of a liquid chemical at a uniform set rate and which will repeat a set rate in stop and start operation.

Another object is to provide such a system which will reliably feed a liquid chemical from a storage container located above or below the feed system, and regardless of varying liquid levels in the storage container.

Another object is to provide such a system which is not adversely affected by gas released from the treatment chemical during the feeding operation or upon start-up.

Another object is to provide such a system which will reliably prevent the back flow of pressurized liquid being treated when no treatment chemical is being fed.

SUMMARY OF THE INVENTION

In the attainment of the foregoing and other objects and advantages, an important feature of the invention resides in providing a vacuum feed system for feeding a liquid chemical using a venturi for reliability inducing the chemical into a flow of liquid to be treated at a uniform, controlled rate. When the venturi produces the necessary vacuum, a normally closed diaphragm pressure regulator opens to permit treatment liquid to be drawn from the storage container until the diaphragm is in equilibrium and a constant flow rate established. The pressure regulator is located at the low point of the system so that the treatment chemical flows upwardly to the venturi ejector through a manually adjustable flow meter with a visual flow rate indicator, a first low pressure check valve, a second low pressure check valve and a high pressure check valve in succession. A spring biased pressure relief valve, connected between the first and second low pressure check valves, has an outlet connected to drain in a manner to relieve pressure in the system in the event of leakage in the high pressure and second low pressure check valves when the system is not in operation, thereby preventing backflow of the liquid being treated from reaching the treatment chemical storage container. The generally vertical, upward flow arrangement of the system components prevents any gas bubbles from being trapped in the system during operation, and enables any gas bubbles which form during shut-down to quickly rise and be drawn off upon start-up so that such "off-gas" bubbles do not interfere with continuous uniform operation.

BRIEF DESCRIPTION OF THE DRAWINGS

Other features and advantages of the invention will become apparent from the detailed description contained herein below, taken in conjunction with the drawings, in which.

DESCRIPTION OF THE PREFERRED EMBODIMENT

Figure 1:
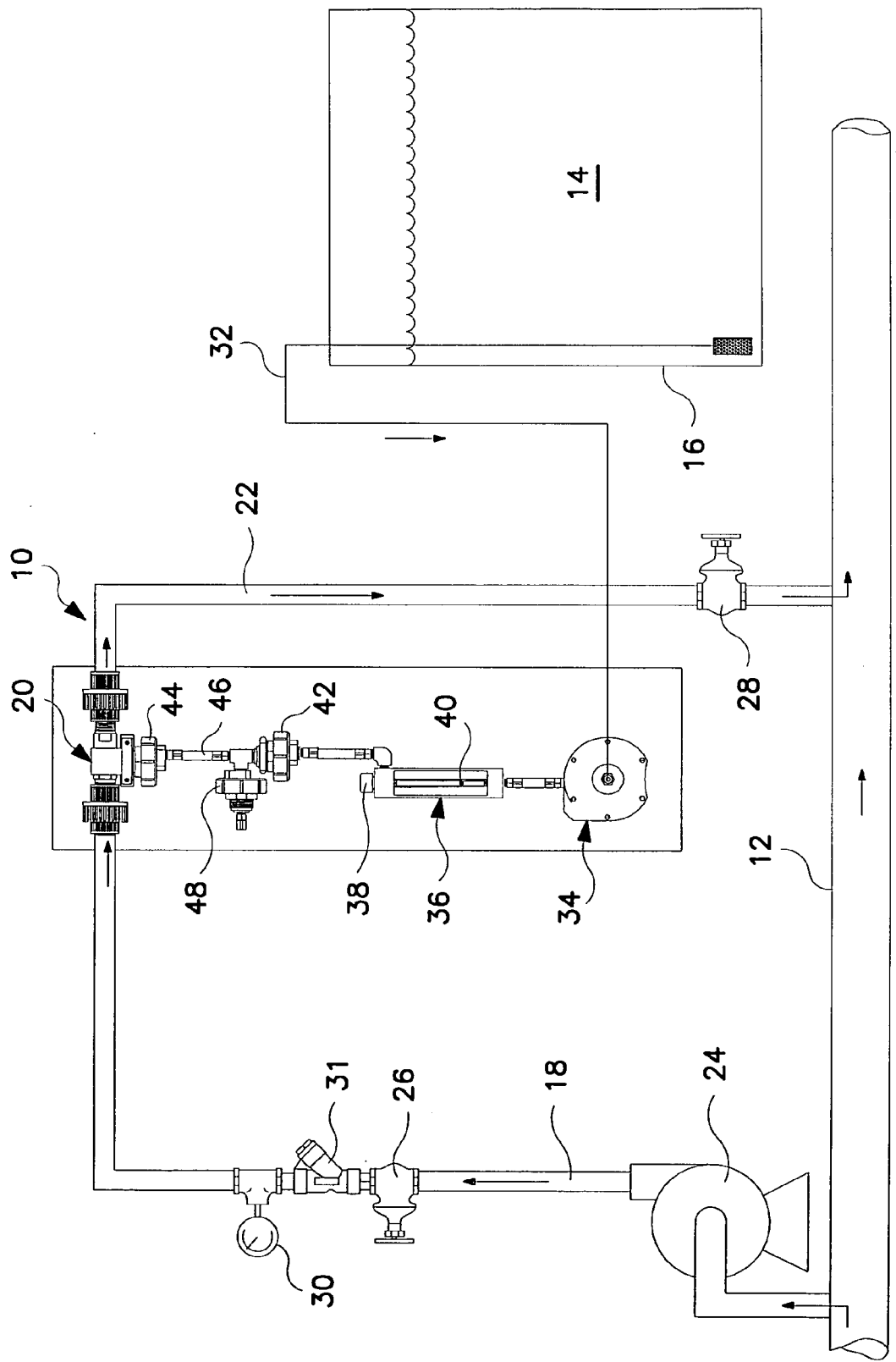
FIG. 1 is a schematic diagram of a vacuum feed system for liquid chemical feeding according to the invention.
Figure 2:
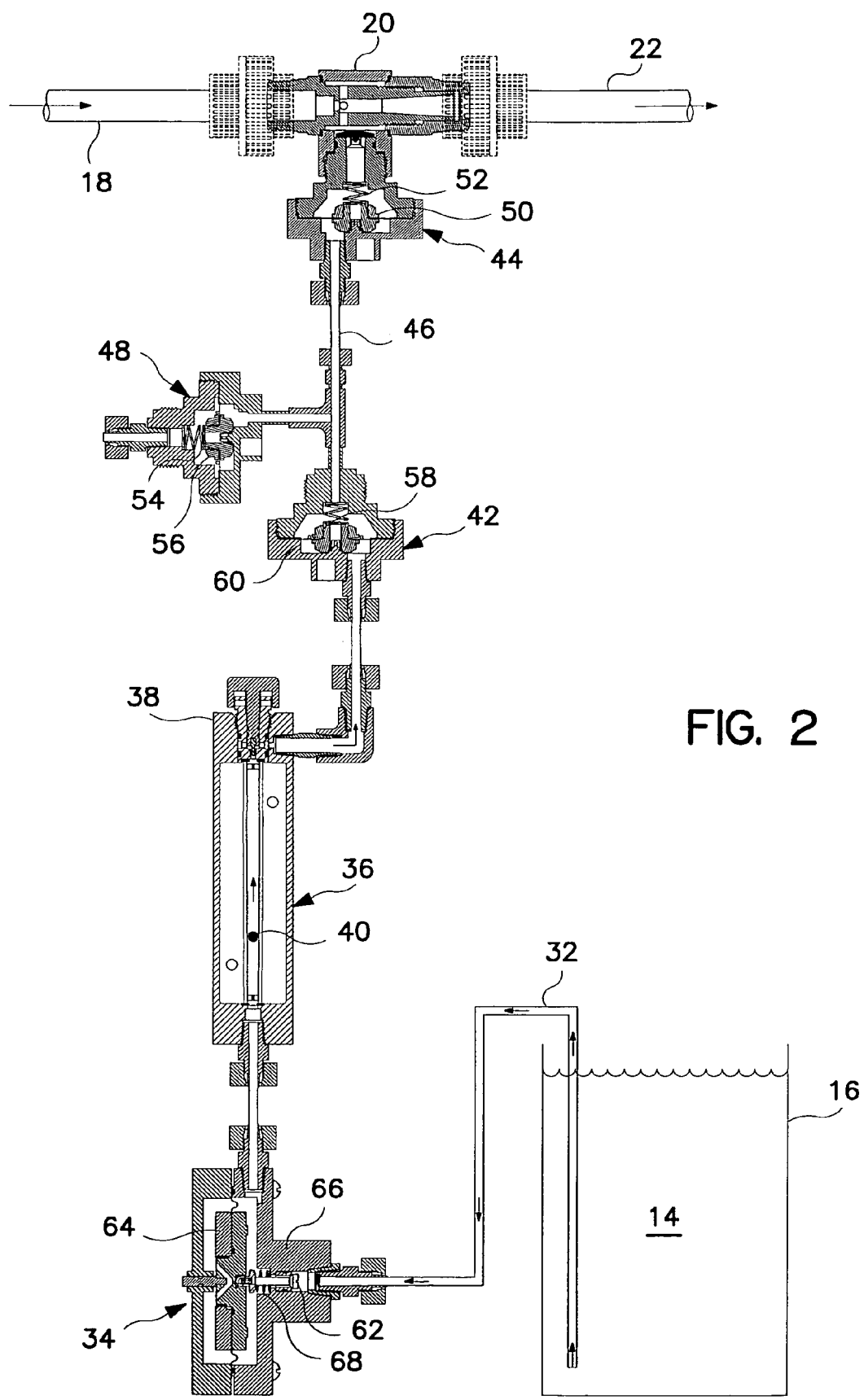
FIG. 2 is an enlarged sectional view, in elevation, of a portion of the structure shown in FIG. 1.

Referring now to the drawings in detail, a vacuum feed system embodying the invention is indicated generally in FIG. 1 by the reference numeral 10 and is illustrated connected to a pressurized water flow pipe 12 of a water treatment system for feeding a liquid treatment chemical 14 such as liquid chlorine from a storage container 16 into the water flowing in pipe 12. The vacuum feed system 10 is connected in a bypass line including a pipe section 18 having an inlet connected to the pipe 12 and a discharge connected to the inlet of a venturi ejector 20, and a discharge pipe section 22 having its inlet end connected to the outlet of ejector 20 and its discharge end connected to the pipe 12 downstream of pipe section 18.

A booster pump 24 is connected in pipe section 18 to provide a positive flow through the ejector 20, and valves 26, 28 are connected in pipe sections 18, 22, respectively, to enable the feed system 10 to be disconnected for service or the like. A pressure gauge 30 and a clean out fitting 31 may be connected in pipe section 18 to enable monitoring the pressure to the inlet of ejector 20.

A feed pipe 32 connects the liquid chemical storage tank 16 to the inlet of a vacuum actuated flow regulator 34 having its outlet connected to the inlet of a flow meter 36. The flow meter 36 includes a manually operated rate adjusting valve 38 and a visual feed rate indicator 40. The flow meter 36 has its outlet connected to a conduit 46 which, in turn, is connected to the inlet of a second one-way check valve 44 having its outlet connected to the ejector 20 for discharging liquid feed chemical 14 from tank 16 into the throat of the venturi section of ejector 20. A pressure actuated drain valve 48 is connected in conduit 46 in a manner to open to drain in the event of pressurization of the conduit 46 as a result of malfunction or leakage of the second check valve 44 when the system is shut down, or in the event of malfunction of the ejector, to thereby prevent water from flowing back through the system to the storage tank 16.

In operation of the system, water flow through the venturi section of ejector 20 from pipe section 18 produces a reduced pressure (vacuum) which, at a predetermined negative pressure lifts the valve element 50 of one-way check valve 44 against the force of closing spring 52 to apply a vacuum to conduit 46. The vacuum in conduit 46 cooperates with spring 54 to maintain the drain valve 48 closed, and acts against the force of spring 58 to lift the valve element 60 of one-way check valve 42 to apply vacuum, through flow meter 36, to the vacuum controlled pressure regulator 34.

The pressure regulator 34 includes a valve member 62 mounted on a diaphragm-supported actuator 64 mounted in a valve body 66, which valve body is open to atmosphere on the side of the diaphragm opposite the valve member 62. A spring member 68 normally urges the valve element 62 and actuator 64 toward the open atmosphere side of the valve body 66 to close the inlet of the regulator. As vacuum is applied to the regulator 34, atmospheric pressure on the diaphragm supported actuator overcomes the force of spring 68 to move valve element 62 from its seat to apply vacuum to the pipe 32 to induce a flow of liquid treatment chemical which is drawn by vacuum through the system and injected into the bypass flow of water at the venture throat of the ejector 20.

When the desired flow rate is established by adjusting the rate control valve 38 of flow meter 36, a uniform pressure is established and maintained in the vacuum controlled flow regulator. This constant pressure and consequent constant flow rate on the upstream side of the flow meter 36 and regulating valve 38 is independent of the level of liquid chemical in the storage tank 16, or its location above or below the level of the vacuum controlled regulator valve.

As schematically shown in the drawings, all components of the feed system 10 from the vacuum regulator controlled inlet valve assembly 34 to the ejector 20 are mounted one above the other in a generally vertical arrangement to provide a continuous upward flow of the liquid chemical being fed. This is particularly important when feeding a liquid chemical such as sodium hypochlorite having a tendency to "off-gas" or release chemical gas and/or dissolved air which tends to form bubbles. The continuous upward flow completely eliminates any possibility of trapping gasses in any component of the system. Even when the system is shut off, entrained air and other gases which form bubbles are completely drawn off through the venturi when the system is restarted and the one-way valves 42, 44 are opened. This elimination of trapped gases and the constant inlet pressure provided by the vacuum controlled inlet valve 34, results in a feed rate that remains constant and will reliably return to the set point upon restart in start/stop operation.

While a preferred embodiment of the invention has been disclosed and described, it is to be understood that the invention is not so limited but rather it is intended to encompass all embodiments which would be apparent to one skilled in the art and which come within the spirit and scope of the invention.

I claim:

1. A vacuum feed system for feeding liquid chemical to a liquid to be treated flowing in a conduit, the system comprising,
   a container for containing a supply of liquid chemical to be fed,
   a vacuum regulated flow control valve having an inlet connected to the container and an outlet, the flow control valve being operable to maintain a uniform pressure at its outlet;
   adjustable valve means for adjusting the feed rate of the liquid chemical being fed, the adjustable valve means having an inlet connected to the outlet of the vacuum regulated flow control valve and an outlet,
   a first one-way check valve having an inlet connected to the outlet of the adjustable valve means, and an outlet, and
   a venturi ejector connected in the conduit for producing an area of negative pressure in the conduit upon flow there through of liquid to be treated,
   the first one-way check valve having its outlet connected to the venturi ejector at the area of negative pressure and being openable by the negative pressure to permit flow there through into the venturi ejector,
   the vacuum regulated flow control valve, the adjustable valve means, the first one-way flow control valve, and the venturi ejector being connected in a generally vertical arrangement in a manner to produce a continuous upward flow of liquid chemical there through upon application of reduced pressure by the venturi ejector to thereby eliminate gas traps in the vacuum feed system.

2. The vacuum feed system according to claim 1, further comprises a second one-way check valve having an inlet connected to the outlet of the first one-way valve and an outlet connected to the venturi ejector at the area of reduced pressure, and a pressure relief drain valve connected between the first and second one-way check valves.

3. The vacuum feed system according to claim 2, wherein the drain valve is normally biased to a closed position, and is opened to drain only upon build-up of a predetermined positive pressure downstream of the first one-way valve.

4. The vacuum feed system for liquid chemical feeding according to claim 1, wherein the adjustable valve means comprises a flow meter including a visual flow rate indicator.

5. The vacuum feed system for liquid chemical feeding according to claim 4, wherein the adjustable valve means is a manually adjustable feed rate control valve.

6. The vacuum feed system for liquid chemical feeding according to claim 5, further comprising a flow meter including a visual flow rate indicator.

7. A vacuum feed system for feeding liquid chemical to a liquid to be treated flowing in a conduit, the system comprising, a container for containing a supply of liquid chemical to be fed, a vacuum regulated flow control valve having an inlet connected to the container and an outlet, the flow control valve being operable to maintain a uniform pressure at its outlet;

adjustable valve means for adjusting the feed rate of the liquid chemical being fed, the adjustable valve means having an inlet connected to the outlet of the vacuum regulated flow control valve and an outlet, a first one-way check valve having an inlet connected to the outlet of the adjustable valve means, and an outlet, and a venturi ejector connected in the conduit for producing an area of negative pressure in the conduit upon flow there through of liquid to be treated, the first one-way check valve having its outlet connected to the venturi ejector at the area of negative pressure and being openable by the negative pressure to permit flow there through into the venturi ejector, a second one-way check valve having an inlet connected to the outlet of the first one-way valve and an outlet connected to the venturi ejector at the area of reduced pressure, and a pressure relief drain valve connected between the first and second one-way check valves.

* * * * *